United States Patent
Stuart et al.

(10) Patent No.: US 11,958,243 B2
(45) Date of Patent: Apr. 16, 2024

(54) SYSTEM FOR CONTINUOUSLY MANUFACTURING COMPOSITE STRUCTURE

(71) Applicant: Continuous Composites Inc., Coeur d'Alene, ID (US)

(72) Inventors: Nathaniel Isaak Stuart, Coeur d'Alene, ID (US); Tyler B. Alvarado, Coeur d'Alene, ID (US); Ryan C. Stockett, Spokane, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 17 days.

(21) Appl. No.: 17/443,265

(22) Filed: Jul. 23, 2021

(65) Prior Publication Data
US 2021/0347119 A1 Nov. 11, 2021

Related U.S. Application Data

(63) Continuation of application No. 16/279,955, filed on Feb. 19, 2019.
(Continued)

(51) Int. Cl.
*B29C 64/209* (2017.01)
*B29C 64/218* (2017.01)
(Continued)

(52) U.S. Cl.
CPC .......... *B29C 64/209* (2017.08); *B29C 64/218* (2017.08); *B29C 64/241* (2017.08);
(Continued)

(58) Field of Classification Search
CPC ... B29C 64/209; B29C 64/307; B29C 64/379; B29C 64/241; B29C 64/218; B25J 9/1635
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Alison L Hindenlang
*Assistant Examiner* — Erica Hartsell Funk
(74) *Attorney, Agent, or Firm* — Ryan Stockett

(57) ABSTRACT

A system is disclosed for use in additively manufacturing a composite structure. The system may include at least one support, and a print head operatively connected to the at least one support and configured to discharge composite material. The system may further include an auxiliary tool operatively connected to the at least one support and configured to receive the composite material discharged by the print head.

17 Claims, 3 Drawing Sheets

Related U.S. Application Data

(60) Provisional application No. 62/730,541, filed on Sep. 13, 2018, provisional application No. 62/656,866, filed on Apr. 12, 2018.

(51) Int. Cl.
| | |
|---|---|
| *B29C 64/241* | (2017.01) |
| *B29C 64/307* | (2017.01) |
| *B29C 64/379* | (2017.01) |
| *B33Y 30/00* | (2015.01) |
| *B33Y 40/00* | (2020.01) |

(52) U.S. Cl.
CPC .......... *B29C 64/307* (2017.08); *B29C 64/379* (2017.08); *B33Y 40/00* (2014.12); *B33Y 30/00* (2014.12)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0029030 A1* | 2/2007 | McCowin ............ | B29C 70/545 |
| | | | 156/173 |
| 2007/0228592 A1 | 10/2007 | Dunn et al. | |
| 2008/0176092 A1 | 7/2008 | Owens | |
| 2009/0078361 A1* | 3/2009 | Kisch ................... | B29C 70/384 |
| | | | 156/173 |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2015/0251409 A1* | 9/2015 | Ohnishi ..................... | B41J 2/01 |
| | | | 347/102 |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |
| 2017/0007363 A1 | 1/2017 | Boronkay | |
| 2017/0007365 A1 | 1/2017 | Kopelman et al. | |
| 2017/0007366 A1 | 1/2017 | Kopelman et al. | |
| 2017/0007367 A1 | 1/2017 | Li et al. | |
| 2017/0007368 A1 | 1/2017 | Boronkay | |
| 2017/0007386 A1 | 1/2017 | Mason et al. | |
| 2017/0008333 A1 | 1/2017 | Mason et al. | |
| 2017/0015059 A1 | 1/2017 | Lewicki | |
| 2017/0015060 A1 | 1/2017 | Lewicki et al. | |
| 2017/0021565 A1 | 1/2017 | Deaville | |
| 2017/0028434 A1 | 2/2017 | Evans et al. | |
| 2017/0028588 A1 | 2/2017 | Evans et al. | |
| 2017/0028617 A1 | 2/2017 | Evans et al. | |
| 2017/0028619 A1 | 2/2017 | Evans et al. | |
| 2017/0028620 A1 | 2/2017 | Evans et al. | |
| 2017/0028621 A1 | 2/2017 | Evans et al. | |

(56) References Cited

U.S. PATENT DOCUMENTS

| | | |
|---|---|---|
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1* | 9/2017 | Hocker ............... B29C 64/245 |
| 2017/0266876 A1 | 9/2017 | Sabic |
| 2017/0274585 A1 | 9/2017 | Armijo et al. |
| 2017/0284876 A1 | 10/2017 | Moorlag et al. |
| 2018/0257305 A1 | 9/2018 | Jones et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2012160269 A1 | 11/2012 |
| WO | 2013017284 A2 | 2/2013 |
| WO | 2016044837 A1 | 3/2016 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |
| WO | WO-2018057784 A1 * | 3/2018 ........... B29C 64/118 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated May 31, 2019 for PCT/US2019/019101 to CC3D LLC Filed Feb. 22, 2019.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

SYSTEM FOR CONTINUOUSLY MANUFACTURING COMPOSITE STRUCTURE

RELATED APPLICATIONS

This application is a continuation of U.S. Non-Provisional application Ser. No. 16/279,955 that was filed on Feb. 19, 2019, which is based on and claims the benefit of priority from United States Provisional Application Nos. 62/656,866 that was filed on Apr. 12, 2018 and 62/730,541 that was filed on Sep. 13, 2018, the contents of all of which are expressly incorporated herein by reference.

TECHNICAL FIELD

The present disclosure relates generally to a manufacturing system and, more particularly, to a system for continuously manufacturing composite structures.

BACKGROUND

Continuous fiber 3D printing (a.k.a., CF3D™) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D™ provides for increased strength, compared to manufacturing processes that do not utilize continuous fiber reinforcement, improvements can be made to the structure and/or operation of existing systems. The disclosed additive manufacturing system is uniquely configured to provide these improvements and/or to address other issues of the prior art.

SUMMARY

In one aspect, the present disclosure is directed to a system for additively manufacturing a composite structure. The system may include at least one support, and a print head operatively connected to the at least one support and configured to discharge composite material. The system may further include an auxiliary tool operatively connected to the at least one support and configured to receive the composite material discharged by the print head.

In another aspect, the present disclosure is directed to another system for additively manufacturing a composite structure. This system may include a support, and a print head operatively connected to the support and configured to discharge composite material. The system may also include at least one of a conveyor belt and a roller operatively connected to the support and configured to receive the composite material discharged by the print head. The at least one of the conveyor belt and roller is configured to selectively move from a stowed position to an engaged position at a discharge location of the print head.

DETAILED DESCRIPTION

Figure 1:
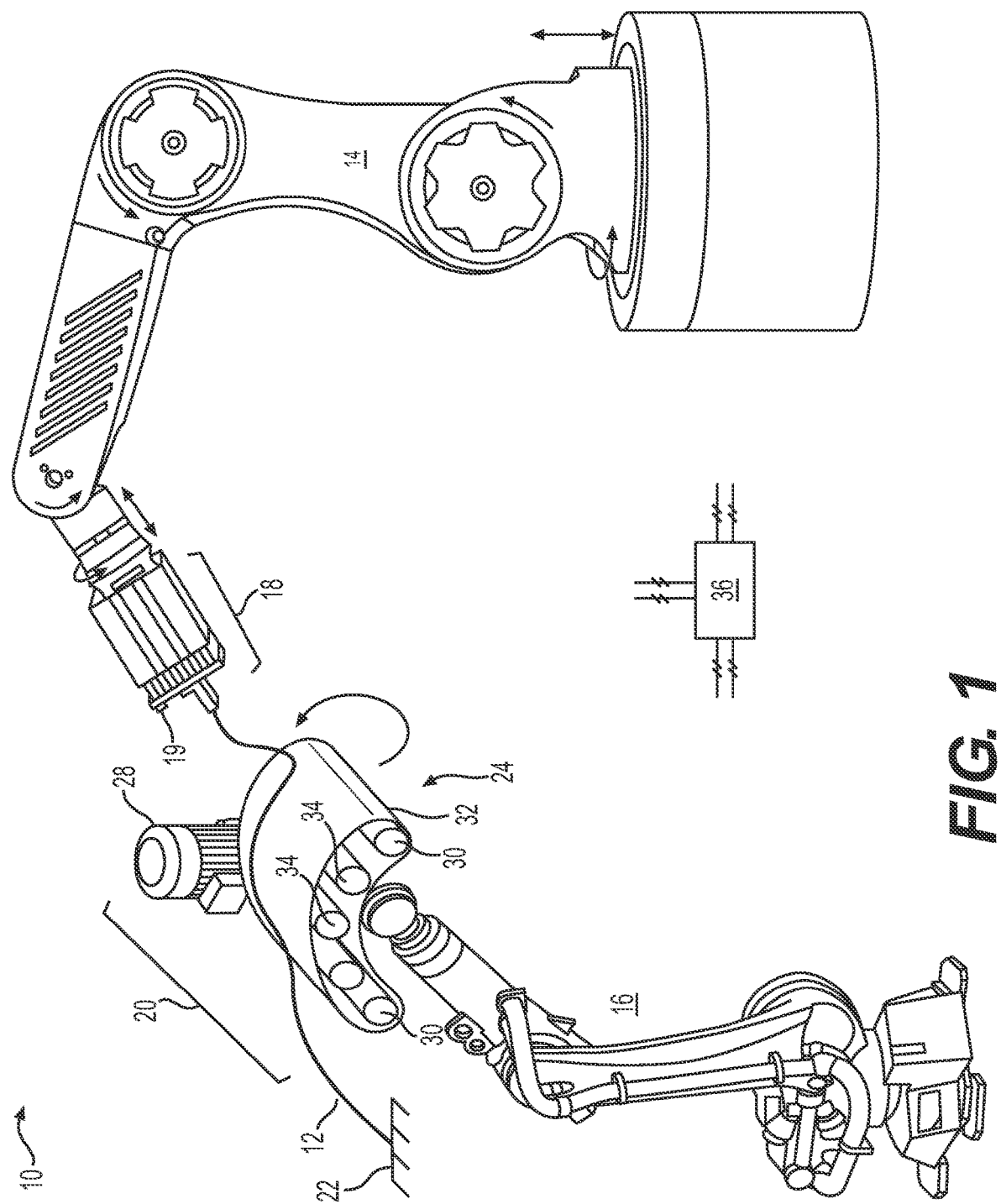
FIG. 1 is diagrammatic illustration of an exemplary disclosed additive manufacturing system.

FIG. 1 illustrates an exemplary system 10, which may be used to continuously manufacture composite structures 12 having any desired cross-sectional shape (e.g., circular, rectangular, or polygonal). System 10 may include at least one support and at least one end-effector coupled to and moved by the at least one support. In the disclosed embodiment of FIG. 1, two different supports are shown, including a first support 14, and a second support 16 that is separate and distinct from first support 14. In this example, both of first and second supports 14, 16 are robotic arms (e.g., the same types of or different arms) capable of moving the respective end-effectors in multiple directions during fabrication of structure 12. Support 14 and/or support 16 may alternatively embody an overhead gantry or a hybrid gantry/arm also capable of moving the respective end-effector(s) in multiple directions during fabrication of structure 12.

A first end-effector 18 may be operatively connected to support 14; and a second end-effector 20 may be operatively connected to support 16. In the example of FIG. 1, end-effector 18 is a print head configured to discharge a composite material, and end-effector 20 is an auxiliary tool that cooperates with the print head during fabrication of structure 12. For the purposes of this disclosure, the terms end-effector 18 and head 18 will be used interchangeably. Likewise, the terms end-effector 20 and tool 20 will be used interchangeably.

Head 18 may be configured to receive or otherwise contain a matrix material. The matrix material may include any type of matrix material (e.g., a liquid resin, such as a zero-volatile organic compound resin, a powdered metal, etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 18 may be pressurized or depressurized, for example by an external device (e.g., by an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed into and/or through head 18. For example, the matrix material may be fed into head 18, and pushed or pulled out of head 18 along with one or more continuous reinforcements. In some instances, the matrix material inside head 18 may need to be kept cool and/or dark in order to inhibit premature curing or otherwise obtain a desired rate of curing after discharge. In other instances, the matrix material may need to be kept warm for similar reasons. In either situation, head 18 may be specially configured (e.g., insulated, temperature-controlled, shielded, etc.) to provide for these needs.

The matrix material may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 18. When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix material discharging from head 18.

The reinforcements may be exposed to (e.g., at least partially coated with) the matrix material while the reinforcements are inside head 18, while the reinforcements are being passed to head 18, and/or while the reinforcements are discharging from head 18. The matrix material, dry reinforcements, and/or reinforcements that are already exposed to the matrix material may be transported into head 18 in any manner apparent to one skilled in the art. In some embodiments, a filler material (e.g., chopped fibers) may be mixed with the matrix material before and/or after the matrix material coats the continuous reinforcements.

One or more cure enhancers (e.g., a UV light, an ultrasonic emitter, a laser, a heater, a catalyst dispenser, a chiller, etc.) 19 may be mounted proximate (e.g., within, on, or adjacent) head 18 and configured to enhance a cure rate and/or quality of the matrix material as it is discharged from head 18. Cure enhancer 19 may be controlled to selectively expose portions of structure 12 to energy (e.g., UV light, electromagnetic radiation, vibrations, heat, a chemical catalyst, a chilled medium, etc.) during the formation of structure 12. The energy may increase a rate of chemical reaction occurring within the matrix material, sinter the material, harden the material, or otherwise cause the material to cure as it discharges from head 18. The amount of energy produced by cure enhancer 19 may be sufficient to cure the matrix material before structure 12 axially grows more than a predetermined length away from head 18. In one embodiment, structure 12 is completely cured before the axial growth length becomes equal to an external diameter of the matrix coated reinforcement.

The matrix material and/or reinforcement may be discharged from head 18 via at least two different modes of operation. In a first mode of operation, the matrix material and/or reinforcement are extruded (e.g., pushed under pressure and/or mechanical force) from head 18 as head 18 is moved by support 14 to create the 3-dimensional trajectory within a longitudinal axis of structure 12. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory. That is, the tension in the reinforcement remaining after curing of the matrix material may act against the force of gravity (e.g., directly and/or indirectly by creating moments that oppose gravity) to provide support for structure 12.

The reinforcement may be pulled from head 18 as a result of head 18 moving away from an anchor point 22. In particular, at the start of structure formation, a length of matrix-impregnated reinforcement may be pulled and/or pushed from head 18, deposited onto anchor point 22, and cured such that the discharged material adheres (or is otherwise coupled) to anchor point 22. Thereafter, head 18 may be moved away from anchor point 22, and the relative movement may cause the reinforcement to be pulled from head 18. It should be noted that the movement of reinforcement through head 18 could be assisted (e.g., via internal head mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

It is also contemplated that, in some applications, the material discharging from head 18 may cure too slowly and/or be too weak for unsupported free-space printing. In these applications, it may be possible to use tool 20 as a temporary mold for the material until adequate curing has been achieved and/or until a sufficient number of material layers have been built up. That is, tool 20 may be moved and oriented by support 16 to a location below an intended free-space trajectory of the discharging material (e.g., in general axial alignment with head 18), such that the material can temporarily rest on tool 20. In some embodiments, tool 20 transfers heat and/or pressure to or away from the material to allow the material to cure faster or to a greater depth while situated thereon. After the material cures to a sufficient degree and/or after enough layers of material have been deposited, tool 20 may be moved to another location and/or used in a different manner. This may allow for free-space printing without the need of permanent or customized molds.

Tool 20 may take any desired form that allows for temporary mold-like support of the material discharging from head 18. For example, tool 20 may include a conveyor belt 24 (see FIGS. 1 and 2) and/or a roller 26 (See FIGS. 3 and 4) onto which the material can be discharged. A motor 28 or other actuator may be situated to selectively drive motion (e.g., rotation) of conveyor belt 24 and/or roller 26 in coordination with the motion of support 14 and/or support 16. With this configuration, tool 20 may always remain at the discharge location of head 18 during travel of head 18 along a predefined trajectory and the discharging material may be deposited onto (and, in some instances pulled out by) a vacant portion of the rotating conveyor belt 24 or roller 26.

In some embodiments, conveyor belt 24 may be configured to flex or curl and thereby impart a corresponding shape into the curing material discharged thereon. For example, conveyor belt 24 may have end-located rollers 30 around which a belt 32 passes, and any number of intermediate rollers 34 positioned between rollers 30. Rollers 30 and/or 34 may be selectively position-adjusted relative to each other to create either a flat surface onto which the material is discharged (see FIG. 2) or a simple or complex curved surface (see FIG. 1) having any number of desired radiuses and/or splines.

It is contemplated that, in some embodiments, head 18 may be selectively held stationary (or moved less than tool 20), while tool 20 is moved, oriented, shaped, and/or rotated to continuously receive and place (e.g., pull and/or deposit) material discharged by head 18 in a desired manner. For example, head 18 may move at a first speed relative to anchor point 22 to cause material to be discharged (e.g., pulled) from head 18 at a first rate, while tool 20 moves at a second speed relative to head 18 to affect (e.g., to increase) the rate at which the material is discharged from head 18. In addition, a simple trajectory of head 18 may combine with a simple trajectory of tool 20 to create a more complex discharge trajectory of the composite material.

It is also contemplated that one or more cure enhancers 19 could be associated with tool 20 instead of or in addition to cure enhancer(s) 19 being associated with head 18. For example, the cure enhancer(s) 19 associated with head 18 may be sufficient to only partially cure and stiffen the discharging material, yet still allow some manipulation of the material. In addition, any cure enhancer(s) 19 associated with tool 20 may further cure and stiffen the discharging material, such that the material remains at a location affected by tool 20.

A controller 36 may be provided and communicatively coupled with support 14, support 16, head 18, any number of cure enhancers 19, and tool 20. Each controller 36 may embody a single processor or multiple processors that are configured to control an operation of system 10. Controller 36 may include one or more general or special purpose processors or microprocessors. Controller 36 may further include or be associated with a memory for storing data such as, for example, design limits, performance characteristics, operational instructions, tool paths, and corresponding parameters of each component of system 10. Various other known circuits may be associated with controller 36, including power supply circuitry, signal-conditioning circuitry, solenoid driver circuitry, communication circuitry, and other appropriate circuitry. Moreover, controller 36 may be capable of communicating with other components of system 10 via wired and/or wireless transmission.

One or more maps may be stored in the memory of controller 36 and used during fabrication of structure 12. Each of these maps may include a collection of data in the form of lookup tables, graphs, and/or equations. In the disclosed embodiment, the maps may be used by controller 36 to determine the movements of head 18 and/or tool 20 required to produce the desired size, shape, and/or contour of structure 12, and to regulate operation of cure enhancers 19 in coordination with the movements.

Figure 2:
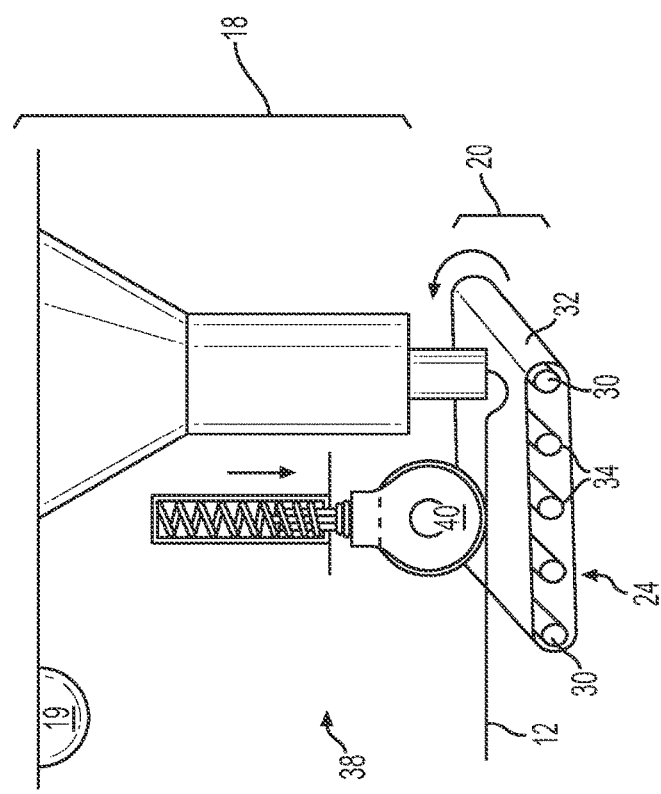

As shown in FIG. 2, in addition to tool 20 functioning as a rotating and moving platform or variable mold onto which material from head 18 can be continuously discharged, tool 20 may also provide resistance to pressures generated by a compactor 38 that trails behind the discharge location (e.g., a nozzle) of head 18. In the disclosed example, compactor 38 is mounted to head 18 and includes a roller 40 that is biased outward toward the material discharging from head 18. When printing overlapping layers (e.g., when not into free-space), roller 40 of compactor 38 may sandwich the discharging material between the roller surface and a previously discharged surface of structure 12 to consolidate fibers and/or remove voids. However, when printing into free space, the discharging material may instead be sandwiched between roller 40 and belt 32 or roller 26 (or smooth low-friction non-rotating surface—not shown) and thereby compressed.

Figure 3:
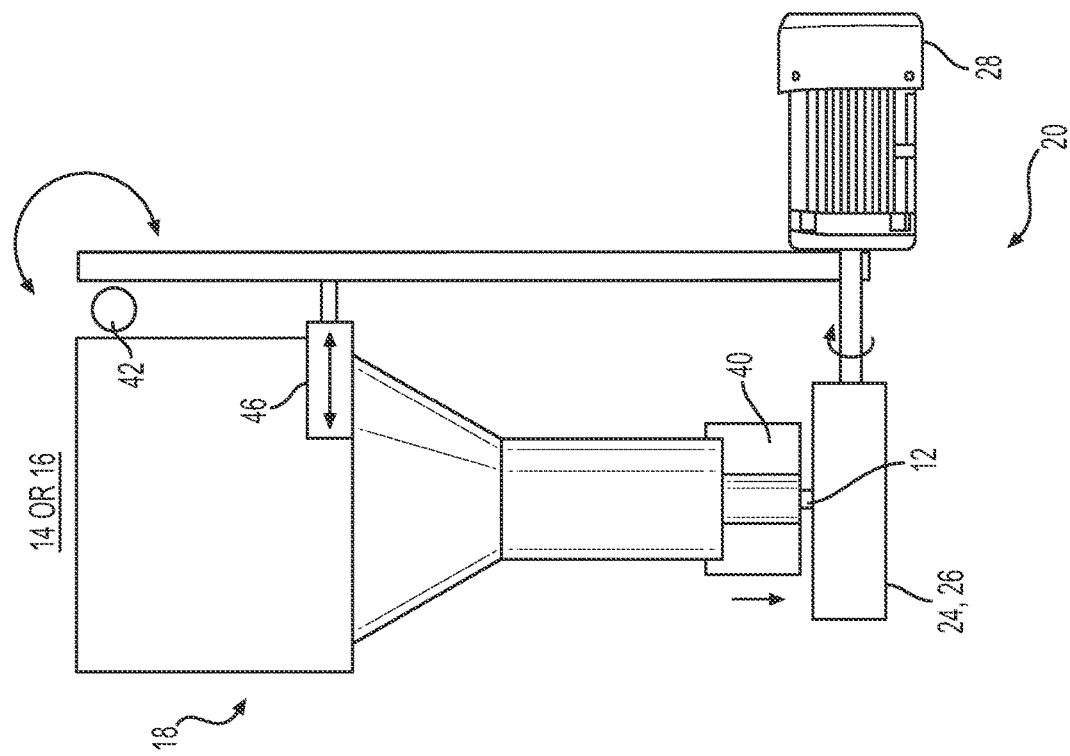
FIGS. 2, 3, and 4 are diagrammatic illustrations of exemplary disclosed end effectors that may be used in conjunction with the additive manufacturing system of FIG. 1.

It is contemplated that head 18 and tool 20 could be mounted to the same support (e.g., 14 or 16), if desired. An example of this arrangement is illustrated in FIG. 3. In this example, tool 20 may be pivotally mounted to head 18 and/or the associated support (e.g., support 14) at a pivot point 42, and only selectively deployed from a stowed position (e.g., via an actuator 44 energized by controller 36) to an engaged position in anticipation of free-space printing. When printing overlapping layers, actuator 44 may be de-energized (or energized in a reverse manner) to move tool 20 out of the way. It is contemplated that other means of deploying tool 20 may alternatively or additionally be utilized.

Figure 4:
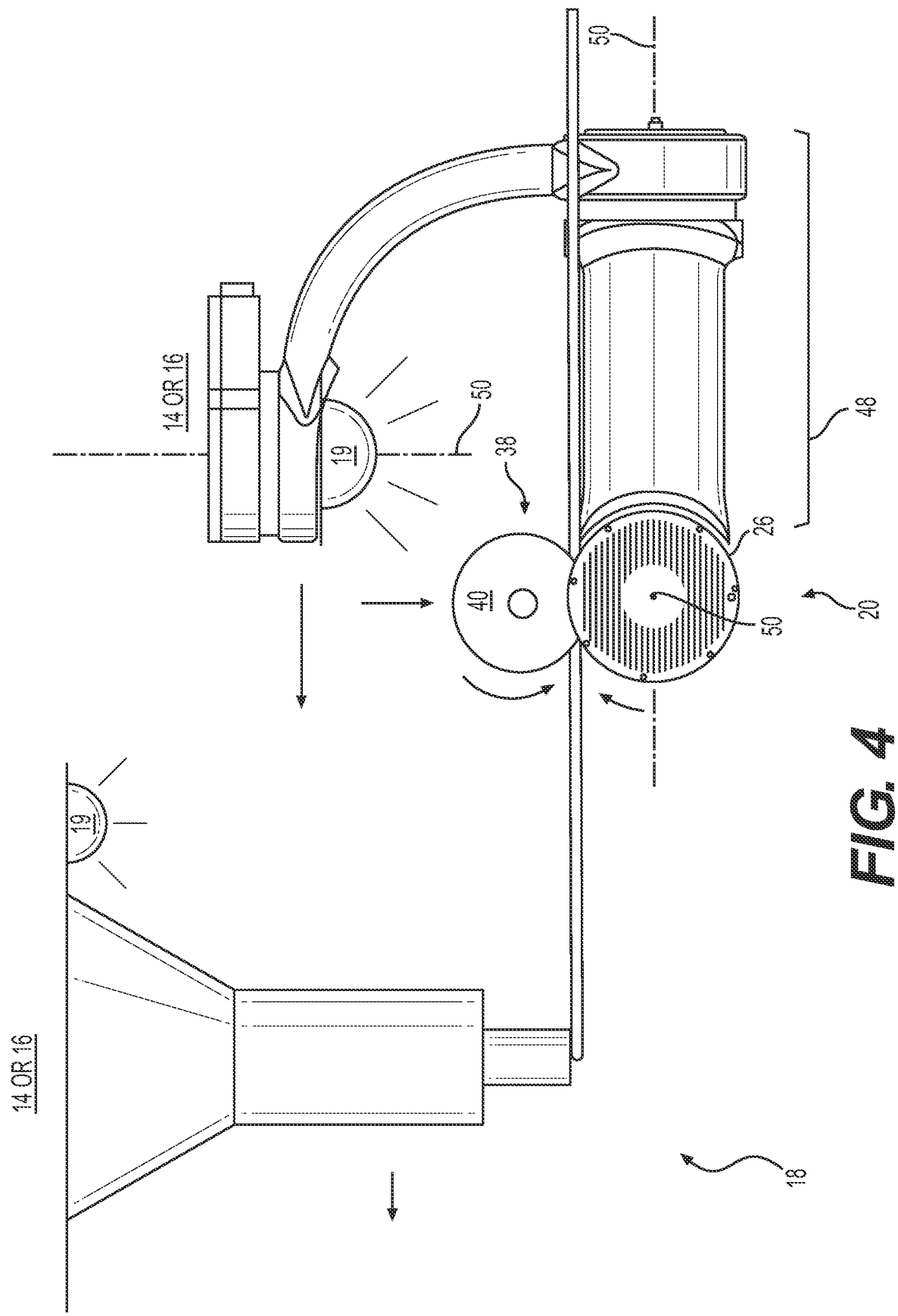

FIG. 4 illustrates a final exemplary embodiment of tool 20. In this embodiment, tool 20 (a conveyor belt 24 or a roller 26) may be mounted to the same support as head 18 or to a different support via a gyroscopic- or gimbal-like connector 48. Tool 20, in this embodiment, may be configured to trail behind head 18 and follow along a desired trajectory of structure 12, as laid out by head 18, without causing significant deviations from the trajectory. In particular, connector 48 may allow conveyor belt 24 and/or roller 26 to rotate freely about one or more axes 50 during pursuit of head 18 without imparting significant forces into structure 12. It is contemplated, however, that tool 20 may be configured to selectively adjust and/or completely change the trajectory of structure 12 (e.g., via one or more actuators associated with axes 50) prior to full curing, if desired. Compactor 38, in the embodiment of FIG. 4, may be an integral part of head 18 or tool 20. In the depicted example, roller 40 of compactor 38 is axially trapped between end flanges of roller 26, such that a desired alignment is always maintained therebetween.

INDUSTRIAL APPLICABILITY

The disclosed systems may be used to continuously manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 36 that is responsible for regulating operations of support 14 and/or head 18). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired surface textures, texture locations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10. In some embodiments, the reinforcements may also need to be connected to a pulling machine (not shown) and/or to a mounting fixture (e.g., to an anchor point). Installation of the matrix material may include filling head 18 and/or coupling of an extruder (not shown) to head 18.

The component information may then be used to control operation of system 10. For example, the reinforcements may be pulled and/or pushed along with the matrix material from head 18. Support 14 may also selectively move head 18 in a desired manner at the same time that support 16 moves tool 20, such that an axis of the resulting structure 12 follows a desired three-dimensional trajectory. Once structure 12 has grown to a desired length, structure 12 may be severed from system 10.

It will be apparent to those skilled in the art that various modifications and variations can be made to the disclosed systems. Other embodiments will be apparent to those skilled in the art from consideration of the specification and practice of the disclosed system. For example, it is contemplated that instead of auxiliary tool 20 having a rotating belt or roller, tool 20 may instead having a smooth low-friction non-rotating surface that slides along below the discharging material, if desired. In addition, it is contemplated that tool 20 may be used primarily or only at a time when a trajectory of the discharging material changes significantly (e.g., turns a corner), wherein tool 20 is used as a temporary anchoring point at a corner location (e.g., until enough layers have been built up to resist undesired movement away from the corner location without the temporary support). It is intended that the specification and examples be considered as exemplary only, with a true scope being indicated by the following claims and their equivalents.

What is claimed is:

1. A method of additively manufacturing a structure, comprising:
   discharging a material from a print head;
   moving the print head during discharging to form the structure;
   moving an auxiliary tool to follow a trajectory of the print head and temporarily receive the material discharging from the print head; and
   thereafter moving the auxiliary tool away from the received material to continue following the trajectory of the print head-and receive additional material.

2. The method of claim 1, wherein:
   moving the print head includes moving the print head with a first support; and
   moving the auxiliary tool includes moving the auxiliary tool with a second support.

3. The method of claim 1, further including compacting the material against the auxiliary tool during discharge of the material into free space, wherein moving the auxiliary tool away from the received material includes moving the auxiliary tool away from the received material after compaction and allowing the material to support itself in free space.

4. The method of claim 3, wherein compacting the material includes pressing a compactor attached to the print head against the material on the auxiliary tool.

5. The method of claim 3, wherein compacting the material includes pressing a compactor attached to the auxiliary tool against the material on the auxiliary tool.

6. The method of claim 1, wherein:
   moving the print head and moving the auxiliary tool includes moving a single support connected to both the print head and the auxiliary tool; and
   the method further includes selectively moving the auxiliary tool from a stowed position to an engaged position at a discharge location of the print head.

7. The method of claim 1, further including allowing the auxiliary tool to rotate freely about at least one axis when following the trajectory of the print head.

8. The method of claim 1, further including coordinating motion of the auxiliary tool with motion of the print head, such that the auxiliary tool is maintained at a discharge location of the print head.

9. The method of claim 1, wherein moving the auxiliary tool away from the received material to continue following the trajectory of the print head and receive additional material includes coordinating motion of the auxiliary tool with motion of the print head, such that the auxiliary tool always trails behind a discharge location of the print head.

10. The method of claim 9, wherein:
    moving the print head includes moving the print head relative to an anchor point to discharge material at a first rate; and
    moving the auxiliary tool includes moving the auxiliary tool relative to the print head to increase the first rate.

11. The method of claim 1, wherein:
    the method further includes exposing the material discharging from the print head to a cure energy; and
    moving the auxiliary tool away from the received material includes moving the auxiliary tool away from the material after the material is at least partially cured.

12. The method of claim 11, wherein exposing the material discharging from the print head to the cure energy includes activating a cure enhancer attached to the auxiliary tool.

13. The method of claim 1, wherein moving the print head includes causing a robotic arm to move the print head.

14. A method of additively manufacturing a structure, comprising:
    discharging a material from a print head;
    moving the print head during discharging to form the structure;
    moving an auxiliary tool to follow a trajectory of the print head and temporarily receive the material discharging from the print head; and
    thereafter moving the auxiliary tool away from the received material to continue following the trajectory of the print head-and receive additional material; and
    wherein the auxiliary tool includes at least one of a conveyor belt and a roller onto which the material is discharged and the method further includes activating the at least one of the conveyor belt and the roller to discharge from the auxiliary tool the received material.

15. The method of claim 14, wherein the auxiliary tool is a conveyor belt and the method further includes curling and thereby adjusting a shape of the material discharged thereon.

16. The method of claim 14, wherein the auxiliary tool further includes a motor configured to drive rotation of the at least one of the conveyor belt and roller and the method includes selectively activating the motor.

17. A method of additively manufacturing a structure, comprising:
    discharging a material from a print head;
    moving the print head along a trajectory during discharging to form the structure;
    moving an auxiliary tool to follow the trajectory of the print head;
    temporarily receiving the material discharging from the print head on the auxiliary tool;
    thereafter moving the auxiliary tool away from the received material;
    moving the auxiliary tool to continue following the trajectory of the print head; and
    receiving, on the auxiliary tool, additional material discharged from the print head.

* * * * *